United States Patent
Romo et al.

(10) Patent No.: US 7,197,225 B2
(45) Date of Patent: *Mar. 27, 2007

(54) VARIABLE OPTICAL ATTENUATOR

(75) Inventors: Mark George Romo, Eden Prairie, MN (US); Charles Ray Willcox, Eden Prairie, MN (US); Stanley Edward Rud, Jr., Victoria, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/430,845

(22) Filed: May 6, 2003

(65) Prior Publication Data

US 2004/0223717 A1    Nov. 11, 2004

(51) Int. Cl.
*G02B 6/00* (2006.01)

(52) U.S. Cl. ............................ 385/140; 385/23; 385/40

(58) Field of Classification Search ............ 385/16–25, 385/140

See application file for complete search history.

(56) References Cited

U.S. PATENT DOCUMENTS

| | | | |
|---|---|---|---|
| 4,152,043 A * | 5/1979 | Albanese ..................... | 385/22 |
| 4,303,302 A | 12/1981 | Ramsey et al. | |
| 4,938,552 A | 7/1990 | Jebens et al. | |
| 5,080,458 A | 1/1992 | Hockaday | |
| 5,127,084 A | 6/1992 | Takahashi | |
| 5,214,727 A | 5/1993 | Carr et al. | |
| 5,226,104 A | 7/1993 | Unterleitner et al. | |
| 5,319,728 A | 6/1994 | Lu et al. | |
| 5,353,363 A | 10/1994 | Keck et al. | |
| 5,382,275 A | 1/1995 | Decao et al. | |
| 5,404,417 A | 4/1995 | Johnson et al. | |
| 5,727,099 A | 3/1998 | Harman | |
| 5,745,634 A | 4/1998 | Garrett et al. | |

(Continued)

FOREIGN PATENT DOCUMENTS

| | | |
|---|---|---|
| WO | WO 02/22494 | 3/2002 |
| WO | WO-02/056096 | 7/2002 |
| WO | WO 03/058286 | 7/2003 |

OTHER PUBLICATIONS

M. Hoffmann, et al., "Lensless Latching-Type Fiber Switches Using Silicon Micromachined Actuators," pp. 1-4, Mar. 2000.

(Continued)

*Primary Examiner*—Sarah Song
(74) *Attorney, Agent, or Firm*—Marshall, Gerstein & Borun LLP

(57) ABSTRACT

A variable optical attenuator has a first and second waveguides that are optically coupled together. At least one of the waveguides has a movable cantilever portion that is movable relative to the other to control attenuation of an optical signal traveling between the two. Preferably, electrically driven actuators deflect the movable waveguides to a relative position at which a desired optical attenuation value is achieved. The electrically driven actuator receives a drive signal that controls the amount of deflection. The drive signal may be set to achieve a desired value for an electrical parameter that varies with the position of the movable waveguide and may be sensed by the electrically driven actuator. In some examples, the drive signal is set to achieve a desired capacitance or voltage difference between the movable waveguide and an electrode.

38 Claims, 11 Drawing Sheets

U.S. PATENT DOCUMENTS

| | | | |
|---|---|---|---|
| 5,862,003 | A | 1/1999 | Saif et al. |
| 5,864,643 | A | 1/1999 | Pan |
| 5,907,404 | A | 5/1999 | Marron et al. |
| 6,085,016 | A | 7/2000 | Espindola et al. |
| 6,130,984 | A | 10/2000 | Shen et al. |
| 6,144,794 | A | 11/2000 | Mao et al. |
| 6,163,643 | A | 12/2000 | Bergmann et al. |
| 6,173,105 | B1 | 1/2001 | Aksyuk et al. |
| 6,173,106 | B1 | 1/2001 | DeBoynton et al. |
| 6,246,826 | B1 | 6/2001 | O'Keefe et al. |
| 6,266,474 | B1 | 7/2001 | Han et al. |
| 6,275,320 | B1 | 8/2001 | Dhuler et al. |
| 6,275,643 | B1 | 8/2001 | Bandy et al. |
| 6,311,010 | B1 | 10/2001 | Medeiros |
| 6,320,999 | B1 | 11/2001 | Pouteau et al. |
| 6,363,183 | B1 | 3/2002 | Koh |
| 6,363,203 | B1 | 3/2002 | Dautartas |
| 6,529,653 | B1 | 3/2003 | Miller |
| 6,577,793 | B2 | 6/2003 | Vaganov |
| 6,625,356 | B2 | 9/2003 | Ticknor et al. |
| 6,628,857 | B1 * | 9/2003 | Bonadeo et al. .............. 385/18 |
| 6,628,882 | B2 | 9/2003 | Vaganov et al. |
| 6,895,161 | B2 | 5/2005 | Romo et al. |
| 6,949,996 | B2 * | 9/2005 | Matsumoto et al. .......... 335/78 |
| 2001/0036333 | A1 | 11/2001 | Kasuga et al. |
| 2002/0028037 | A1 | 3/2002 | Steinberg et al. |
| 2002/0031305 | A1 | 3/2002 | Ticknor et al. |
| 2003/0012545 | A1* | 1/2003 | Bellman et al. ............. 385/140 |
| 2003/0049009 | A1 | 3/2003 | Vaganov et al. |
| 2004/0208422 | A1* | 10/2004 | Hagood et al. ................ 385/16 |

OTHER PUBLICATIONS

P. Kopka et al., "Bistable 2×2 and Multistable 1×4 Micromechanical Fibre-optic Switches on Silicon," pp. 88-90, 1999.

Eng, et al. "Voltage—Controlled Micromechanical SOI Optical Waveguides," *IEEE Tencon* (1995) pp. 195-197, 1995.

Wood, et al. "SCOFFS: A Small Cantilevered Optical Fiber Servo System," *IEEE* (1987).

M. Hoffmann, et al., "Lensless Latching-Type Fiber Switches Using Silicon Micromachined Actuators," 25th Optical Fiber Communication Conference, OFC 1000, Baltmore, Maryland, USA, Technical Digest, Thursday, Mar. 9, 2000.

P. Kopka et al., "Bistable 2×2 and Multistable 1×4 Micromechanical Fibre-optic Switches on Silicon," 3rd International Conference on Micro Opto Electro Mechanical Systems, MOEMS'99, Mainz, 1999, Proceedings pp. 88-91.

Hoffmann, et al., "Optical fibre switches based on full wafer silicon micromachining," J. Micromech. Microeng. 9:151-155 (1999).

Watts, et al., "Electromechanical Optical Switching and Modulation in Micromachined Silicon-On-Insulator Waveguides," IEEE 62-63 (1991).

Wu, et al., "Deflecting-fiber type MEMS variable optical attenuator," Proc. SPIE 4604:61-66 (2001).

Zhang, et al., "A Vertical Electrostatic Actuator with Extended Digital Range via Tailored Topology," Proc. SPIE 4700:147-156 (2002).

International Search Report issued in PCT/US2004/008772 on Aug. 19, 2004.

Written Opinion issued in PCT/US2004/008772, mailed Aug. 31, 2004.

Kan et al., "Silicon-on-insulator (SOI) movable integrated optical waveguide technology," Sensors and Actuators A, 54:679-683 (1996).

"Optomechanical Scanner," IBM Technical Disclosure Bulletin, 40:133-136 (1997).

* cited by examiner

VARIABLE OPTICAL ATTENUATOR

FIELD OF THE INVENTION

The present invention relates generally to optical attenuators and, more particularly, to methods and structures for variable optical attenuation.

BACKGROUND OF RELATED ART

Optical networks, e.g., telecommunications networks, are formed of numerous devices. Switches, routers, couplers, (de)multiplexers, and amplifiers are commonplace in networks. These devices must be compatible with one another to function properly, i.e., they must be able to receive and transmit compatible signals. For some networks, this compatibility requires that network devices operate on signals within a specified intensity range—a constraint that makes network power level management quite important.

Systems designers often rely upon optical attenuators to properly manage network power levels. These attenuators can be stand-alone or integrated with other devices to controllably set signal intensities. Intensity can be controlled between serial devices like amplifier stages, between parallel devices like switching banks, and even within a single optical device, like an attenuator integrated into an existing wavelength division multiplexing (WDM) device to normalize channel intensities.

For many applications, attenuators are fabricated by suppliers that, in turn, supply optical device manufacturers who assemble the network appliances (switches, routers, etc.). Since different networks may be optimized for different signal intensity levels, suppliers will often make a batch of identical optical devices and then tailor some of them to meet the needs of the device manufacturer, i.e., the particular network.

Variable optical attenuators (VOAs), where the amount of attenuation is adjustable, are known. VOAs are commonly formed of a blocking structure (like a movable absorber or partially reflecting structure) disposed in a free space region between an input waveguide and an output waveguide. The position of the blocking structure within the free space region determines the amount of attenuation. Shutters, mirrors, prisms, and even liquid crystal structures have been used as blocking structures.

Another attenuation method used misaligns fibers via a mechanical spring, a technique that results in significant temperature-dependent instabilities. Axial separation between fiber ends has also been proposed, though the methods require a large displacement and expensive moving parts.

In other forms, people have developed continuous wave attenuation devices formed of two waveguides twisted and fused together to form a bulk switching/attenuation region. Some of these devices also use thermal elements for selective switching and attenuation control. Still others have developed VOAs that use a Faraday rotator or pockel cell-like structure to attenuate based on polarization state.

While these techniques may be useful for some applications, they introduce undesirable manufacturing costs and complexity of operation. Furthermore, the devices are bulky and incompatible with networking environments where space is a major concern. They are also difficult to install within a network and, therefore, can result in substantial network downtime or slowdown. Perhaps even more important, many of these known VOA devices introduce a substantial amount of unintentional and undesirable loss. For example, insertion loss and polarization dependent loss (PDL) greatly limit operation of known VOA devices. Further, known VOAs also exhibit stability problems malfunctioning if moved or jostled during operation.

It is, therefore, desirable to have VOAs that are not overly bulky, do not use extra components, such as partially reflecting elements or thermal switches, are lower in cost to fabricate, and operate with less loss.

SUMMARY OF THE INVENTION

In accordance with an embodiment, provided is an electrically variable optical attenuator including a first waveguide having a base portion and a movable cantilever portion extending from the base portion, the cantilever portion including a first terminus, and a first support adapted to receive the base portion of the first waveguide. The electrically variable optical attenuator includes a second waveguide having a second terminus; a second support adapted to receive at least a portion of the second waveguide such that the second terminus and the first terminus are in a first, optically coupled state having a first optical attenuation; and an electrically driven actuator adapted to move the first terminus such that the first terminus and the second terminus are in a second, optically coupled state to provide a range of desired optical attenuation values.

In accordance with another embodiment, provided is an electrically variable optical attenuator including a first support for supporting a first optical waveguide having a conductive movable cantilever portion; a second support for supporting a second optical waveguide having a conductive movable cantilever portion; a first electrically driven actuator having a first plurality of electrodes disposed on a cavity surface and adjacent the conductive movable cantilever portion of the first optical waveguide for selectively deflecting the conductive movable cantilever portion of the first optical waveguide; and a second electrically driven actuator having a second plurality of electrodes disposed on the cavity surface and adjacent the conductive movable cantilever portion of the second optical waveguide for selectively deflecting the conductive movable cantilever portion of the second optical waveguide.

In accordance with another embodiment, provided is an electrically variable optical attenuator including a first waveguide having a base portion and a movable cantilever portion including a first terminus; a first support adapted to receive the base portion of the first waveguide; a second waveguide having a base portion and a movable cantilever portion including a second terminus; a second support adapted to receive the second waveguide such that the second terminus and the first terminus are in a first, optically coupled state having a first optical attenuation; a first electrically driven actuator adapted to move the first terminus relative to the second terminus; and a second electrically driven actuator adapted to move the second terminus relative to the first terminus.

In accordance with another embodiment, provided is a method of variable optical attenuation including disposing an optical waveguide in a first support and adjacent an electrically driven actuator, the optical waveguide having a cantilever portion including a first terminus; disposing a second optical waveguide in a second support such that a second terminus of the second optical waveguide is optically coupled to the first terminus in a first position; and driving the electrically driven actuator to move the first terminus relative to the second terminus to a second position to achieve any one of a range of desired optical attenuations.

DETAILED DESCRIPTION OF PREFERRED EXAMPLES

While preferred examples and numerous alternatives thereto are provided below, it will be appreciated by persons of ordinary skill in the art that these are merely examples and not intended to be exhaustive. On the contrary, the teachings herein may be used in many optical devices. Further, while the descriptions provided below are generally in the context of variable optical attenuation, the teachings herein may be used to move waveguides for other purposes, as will be apparent to persons of ordinary skill in the art. The teachings herein may also be used to correct for or induce misalignment between waveguides for purposes other than attenuation and in structures other than those exemplarily shown. Further, while electrically driven actuators in the form of electrostatic actuators are described in most examples, other electrically driven actuators may be used in any of the disclosed examples. Electrically driven actuators receive an electrical signal to actuate movement of a waveguide. Examples include electrostatic, electrothermic, and electromagnetic actuators, though persons of ordinary skill in the art will know of other electrically driven actuators, including other electromechanical actuators.

Figure 1:
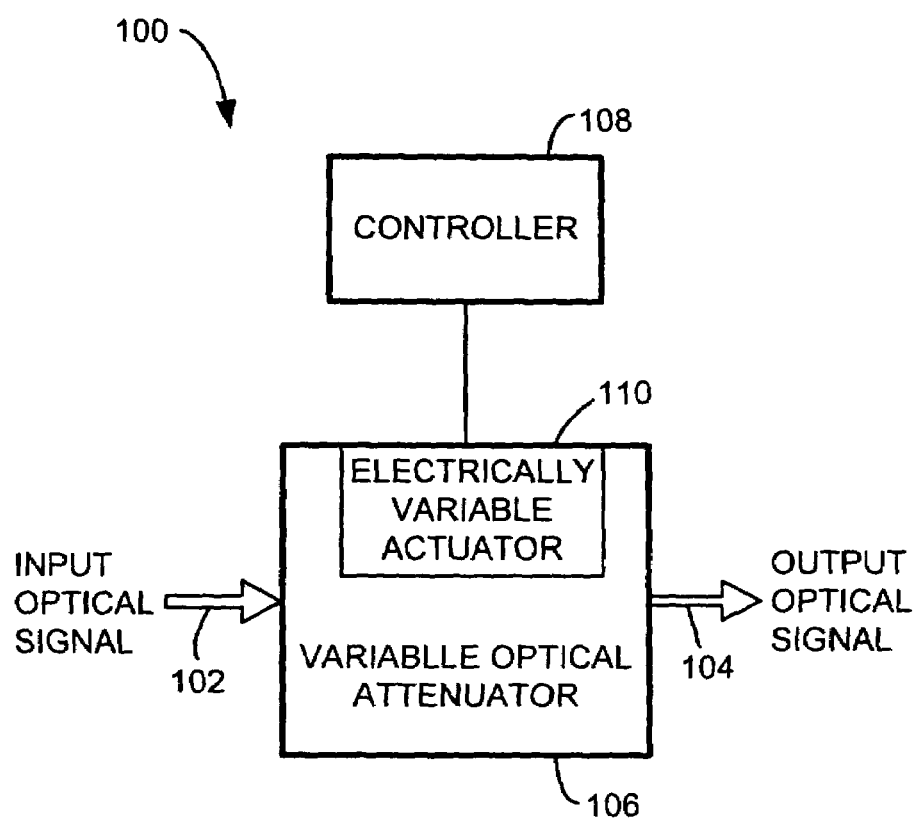
FIG. 1 is a block illustration of an example optical attenuation system having a variable optical attenuator disposed between a laser and a receiver.

FIG. 1 shows an example laser system 100 with an input optical signal traveling on an input waveguide 102 coupled to an output optical signal traveling on an output waveguide 104 via a variable optical attenuator 106. The input optical signal may be from diode laser, gas laser, amplifier, transponder, or other laser or optical source. The input optical signal may be an information carrying laser signal or, alternatively, a single-frequency laser energy, pulsed or continuous-wave. The input optical signal may be coupled to the variable optical attenuator 106, for example, through an optical fiber. The variable optical attenuator 106 is controlled by a controller 108.

The variable optical attenuator 106 receives the input optical signal and attenuates that signal under control of the controller 108. The variable optical attenuator 106 is capable of providing an output optical signal that may have any of a range of desired intensities. Common telecommunication applications require 0 dB to 20 dB attenuation. With the present examples, 40 dB or more attenuation may be achieved. The controller 108 determines the amount of attenuation provided by the variable optical attenuator 106. In an example, the variable optical attenuator 106 includes two optically, coupled waveguides at least one of which is movable relative to the other. The controller 108 provides a control signal to an electrically variable actuator (EVA) 110 in the variable optical attenuator 106 to adjust, set, and/or determine the position of the movable waveguide(s). If the electrically variable actuator is an electrostatic actuator, the controller 108 provides a drive voltage to actuator electrodes. The movable waveguide(s) moves under an electrostatic force created by the electrodes. The EVA 110 may be an electrothermic or electromagnetic actuator, as well. An electrothermic actuator receives an electrical control signal from the controller 108 and creates a thermal change within the attenuator 106, for example, by heating an element on a movable waveguide causing an expansion that deflects that waveguide. An electromagnetic actuator is one that converts an electrical signal into a magnetic force, which then moves the waveguide(s).

Figure 2A:
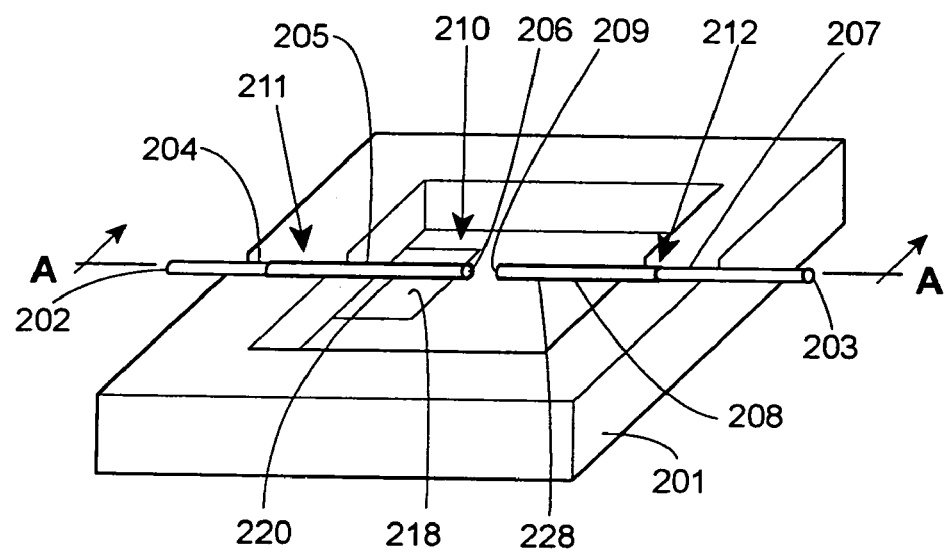
FIG. 2A is an illustration of one embodiment of an example optical attenuator showing a first waveguide and a second waveguide disposed on a base member.

FIG. 2A illustrates a portion of an example optical attenuator 200 (See FIGS. 3A and 3B) that may be used as the variable optical attenuator 106. The optical attenuator 200 is a variable optical attenuator including a base member 201 supporting two waveguides 202, 203, in the form of optical fibers in the illustrated example. Silicon is an example material for the base member 201. The first waveguide 202 has a base portion 204 and a movable cantilever portion 205 with a terminus 206. The second waveguide 203 has a base portion 207 and a cantilever portion 208 that may be movable or fixed. A terminus 209 is at an end of the cantilever portion 208.

In the un-actuated condition illustrated, the terminus 206 and the terminus 209 are axially aligned for maximum waveguide-to-waveguide coupling of energy. Alternatively, the termini 206, 209 may be misaligned in the un-actuated position.

The cantilever portions 205 and 208 extend over a recess 210, which may be formed in the base member 201 through a photolithographic definition and chemical etching process, for example. With the cantilever portions 205 and 208 suspended over the recess 210, one or both of the termini 206, 209 may be freely moved. In an embodiment, cantilever portions 205 and 208 are formed from substantially identical optical fibers made of fused silica, a flexible material with a restoring spring force that biases the structure to its original position. Example fibers include single-mode Corning SMF-28® fibers with angled or flat end-faces at the termini.

Figure 2B:
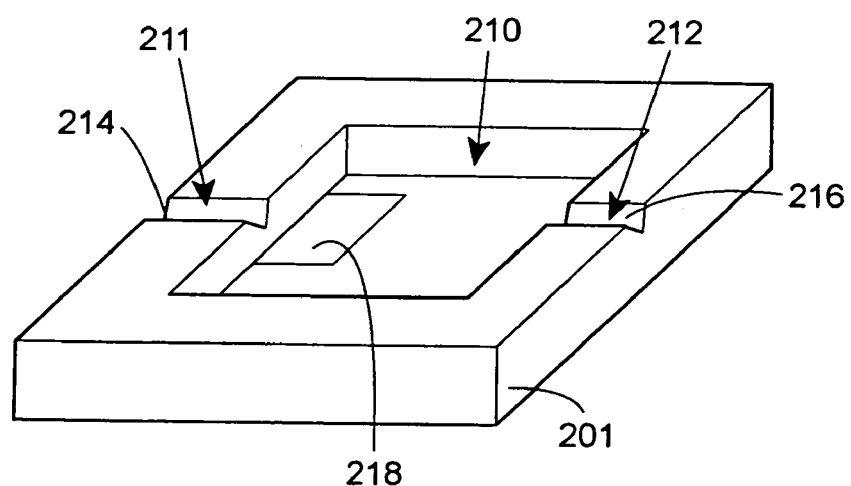
FIG. 2B is an illustration of the structure of FIG. 2A showing waveguide supports.

The base portions 204 and 207 are affixed to first and second supports 211 and 212, for example, using a bonding material (not shown). The base member 201 may be fabricated from fused silica wafers to precisely match the expansion coefficient of the waveguides 202 and 203, if they are also formed of fused silica. The supports 211, 212 may be formed from silicon wafers with anisotropically etched v-grooves 214 and 216 (best seen in FIG. 2B) that receive the base portions 204 and 207. The v-grooves 214 and 216 may alternatively be mechanically formed. Axially aligning the v-grooves 214 and 216 aligns the termini 206 and 209 in the un-actuated position. The v-grooves 214 and 216, however, may be misaligned so that the two waveguides 202 and 203 are axially misaligned in the un-actuated position. When axially aligned, the waveguides 202 and 203 have a maximum coupling; misaligning them produces a un-actuated, attenuated coupling.

In the illustrated example, the device 200 is a dual cantilever device in which one or both of the cantilever portions 205 and 208 may be moved to attenuate a signal propagating from one to the other of the waveguides 202, 203.

Figure 3A:
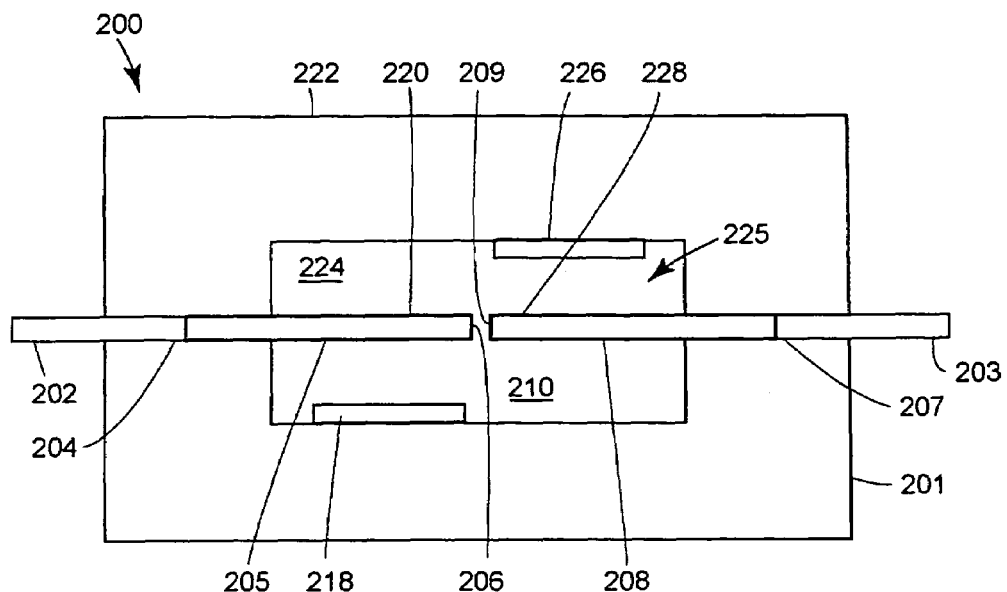
FIGS. 3A and 3B are cross-sectional views of an example optical attenuator including a top member and depicting separate attenuation conditions each.
Figure 3B:
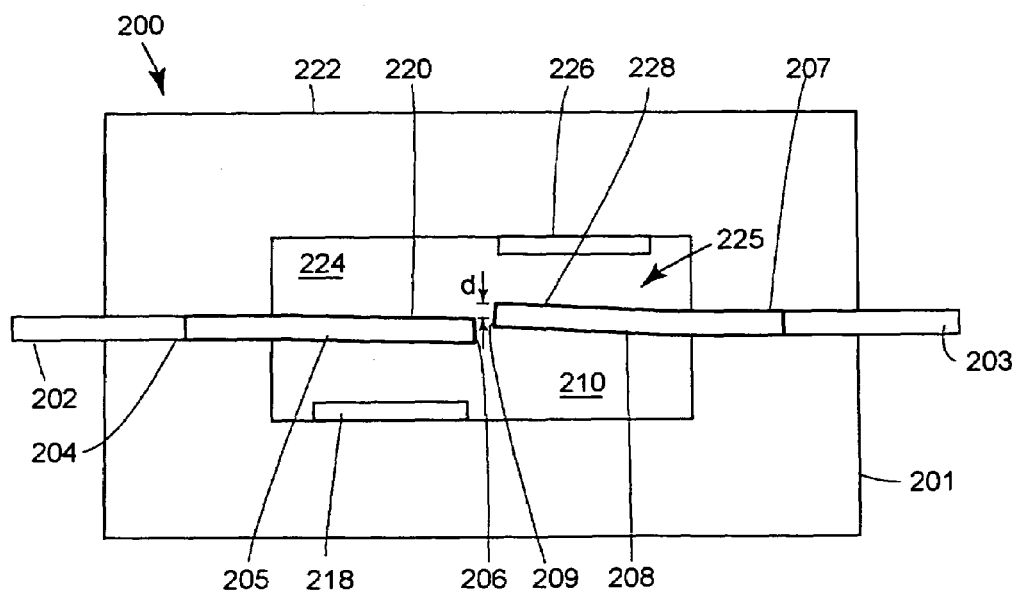

FIGS. 3A and 3B show a cross-sectional view of the assembled optical attenuator 200 having the base member 201 and a top member 222 attached thereto. The top member 222 is substantially identical to the base member 201. The top member 222 includes a recess 224 with a third electrode 226 similar to the electrode 218. The recesses 224 and 210 form a cavity 225, which in the illustrated example has a uniform depth. The third electrode 226 and a fourth electrode 228 on the cantilever portion 208 form a second electrically variable actuator. FIG. 3B shows the structure of FIG. 3A with the two cantilever portions 205 and 208 deflected in opposite directions towards their electrostatic actuator electrodes 218 and 226, respectively, to achieve a desired attenuation of a signal propagating between the two. In other words, FIG. 3A shows a first optical attenuation position where there is the least amount of attenuation, and FIG. 3B shows a second optical attenuation position where the system has been adjusted to achieve a desired amount of attenuation.

In FIG. 3B, the termini 206 and 209 are optically coupled but misaligned a distance, d, thereby causing optical attenuation. The attenuation between the optically coupled termini 206 and 209 varies nonlinearly as a function of axial offset, i.e., offset from the coaxially aligned position. In the preferred example, the termini 206 and 209 are always optically coupled for energy transfer.

FIGS. 3A and 3B provide example attenuation conditions. Actuation of the cantilever portion 205 is achieved by a first electrode 218 in the recess 210 and a second electrode 220 on the cantilever portion 205. The electrodes 218 and 220 form a first electronically variable actuator. The first electrode 218 may be deposited into the recess 210, and the second electrode 220 may be deposited around a cladding of the cantilever portion 205. The cantilever portion 205 may have a narrowed fiber section, that is, one with a reduced cladding or no cladding, which may increase fiber flexibility. The cantilever portion 205 may also have an expanded core. In the illustrated example, the cantilever portions 205 and 208 are geometrically matched in length and diameter to cancel temperature and acceleration errors.

In operation, a control device like the controller 108 provides an electrostatic actuator drive signal from the electrode 218 to electrode 220 to move the terminus 206 into the recess 210. Another drive signal may be applied to the electrode 226 and the electrode 228 for moving the cantilever portion 208 into the recess 224. The two drive signals may be a common drive voltage, moving each cantilever portion 205, 208 in equal magnitude and opposite directions. Of course, the two drive signals may be different, as well. In an embodiment, the drive signals are pulse-width modulated (PWM) voltages. Furthermore, the drive signals may be derived from a look-up table that stores drive signal voltage versus desired attenuation values. A calibration may be performed on the assembly 200 to form the look-up table. Further still, as discussed additionally below, the drive signal may be derived from a feedback loop, where the drive signal value is determined in response to a measured attenuation value or a deflection-dependant measured parameter value, such as an electrical value like capacitance, voltage, current, inductance, or frequency.

Figure 4A:
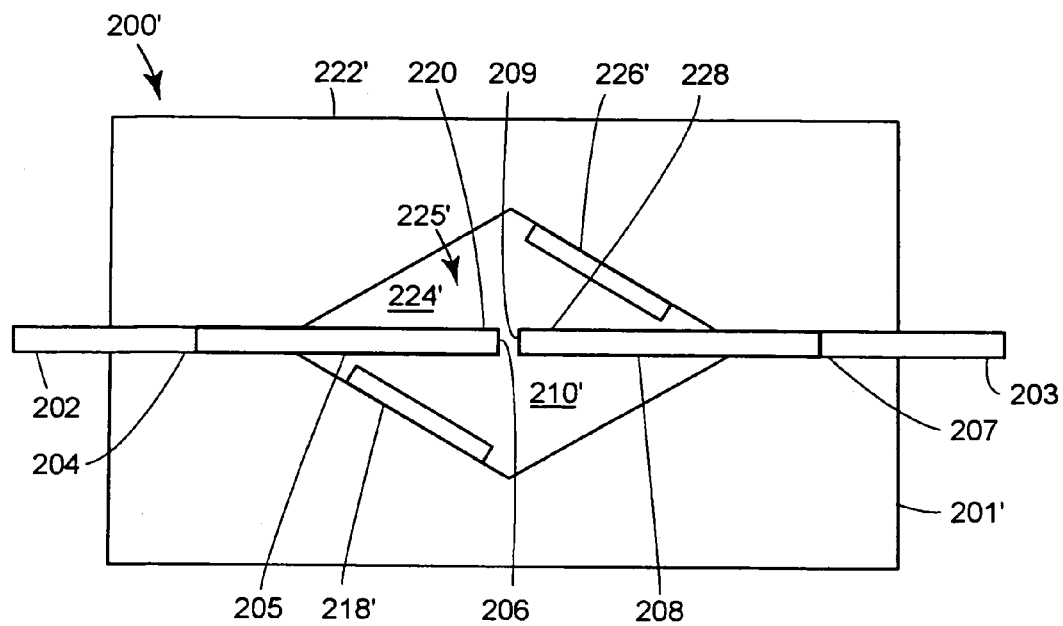
FIGS. 4A and 4B are cross-sectional views of another example optical attenuator including a top member and depicting separate attenuation conditions each.
Figure 4B:
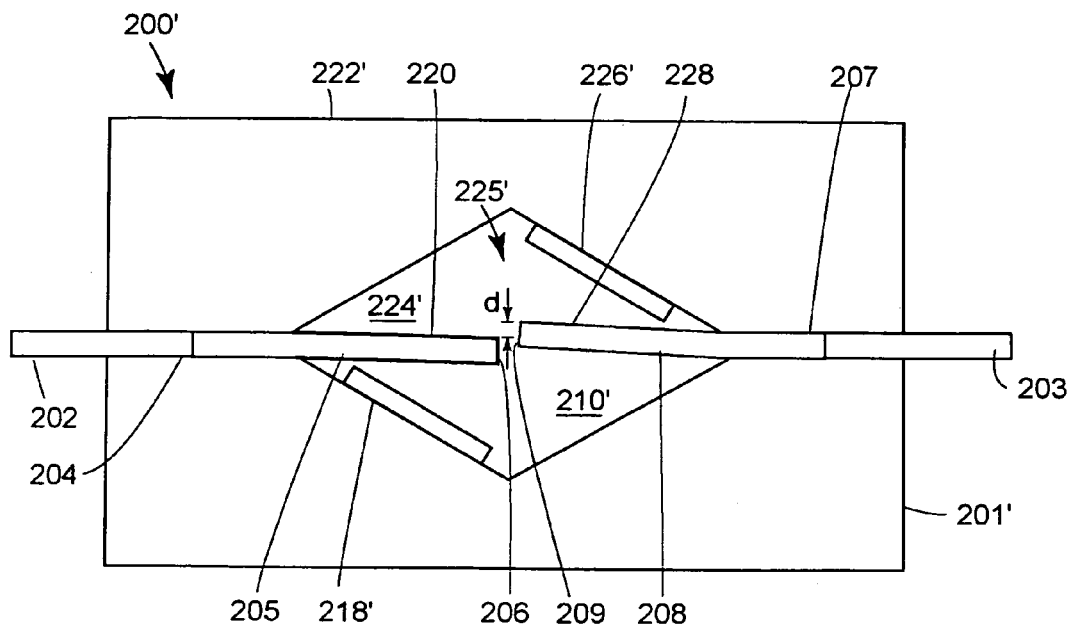

FIGS. 4A and 4B show an example structure 200' similar to structure 200 of FIGS. 3A and 3B, and thus like reference numerals are used, in prime form. The example of FIGS. 4A and 4B have a base member 201' with a variable depth recess 210' and a top member 222' with a variable depth recess 224'. The recesses 210' and 224' form a cavity 225' having a variable depth. A variable depth cavity may lower the voltage magnitude for a given deflection.

Figure 5:
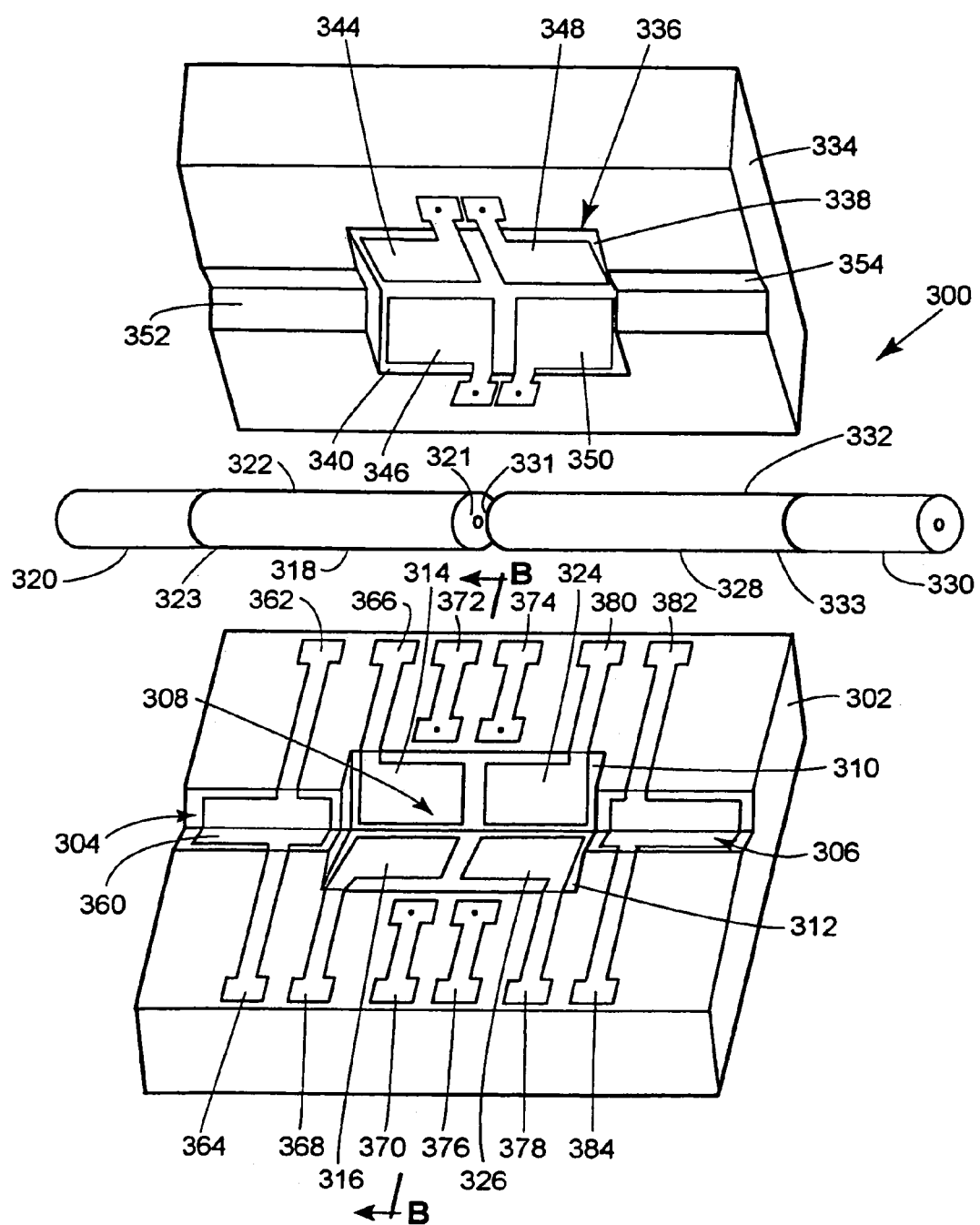
FIG. 5 is an exploded view of another example optical attenuator.

FIG. 5 illustrates a portion of another example optical attenuator 300 formed of a base member 302 having two v-groove supports 304 and 306 and a recess 308. The recess 308 has two side walls 310, 312. Electrodes 314 and 316 are disposed on the side wall 310, 312, respectively, adjacent a cantilever portion 318 of a waveguide 320. These electrodes 314 and 316, as well as the other similar electrodes described herein, may be electrically insulated from direct contact with the base member 302. In the illustrated example, the waveguide 320 is an optical fiber having a terminus 321 and a conductive layer 322 that at least partially extends from a base portion 323 held in place on the support 304. Two additional electrodes 324 and 326 are positioned at an opposing end of the recess 308, adjacent a cantilever portion 328 of an optical fiber 330, which also has a terminus 331 and a conductive layer 332 and a base portion 333 held in place on the support 306. The conductive layers 322 and 332 may be formed by applying or depositing a metal layer around the fibers 320 and 330, respectively. An electroless plating process using a chemical precursor step or a physical deposition process may be used. The optical fibers 320 and 330 are positioned with their cantilever portions 318 and 328 extending over the recess 308.

A top member 334 is also shown in FIG. 5. The top member 334 includes a recess 336 with two side walls 338, 340. The recess 336 and the recess 308 form a cavity 342 (see FIG. 6) within which cantilever portions 318 and 328 may be deflected. The cavity 342 may be diamond-shaped in cross-section or it may take on other shapes. The base member 302 and the top member 334 may be bonded, fused, clamped, or otherwise mounted together to form the unitary structure depicted in FIG. 8. Electrodes 344, 346 are formed on the side walls 338, 340, respectively, to operate on the cantilever portion 318, as with the electrodes 314 and 316. Other electrodes 348 and 350 are formed in the recess 336 to operate on the cantilever portion 328, as with the electrodes 324 and 326.

The top member 334 also includes v-groove supports 352 and 354, which combined with supports 304 and 306, enclosing base portions 323 and 333 of the optical fibers 320 and 330, respectively.

Figure 6:
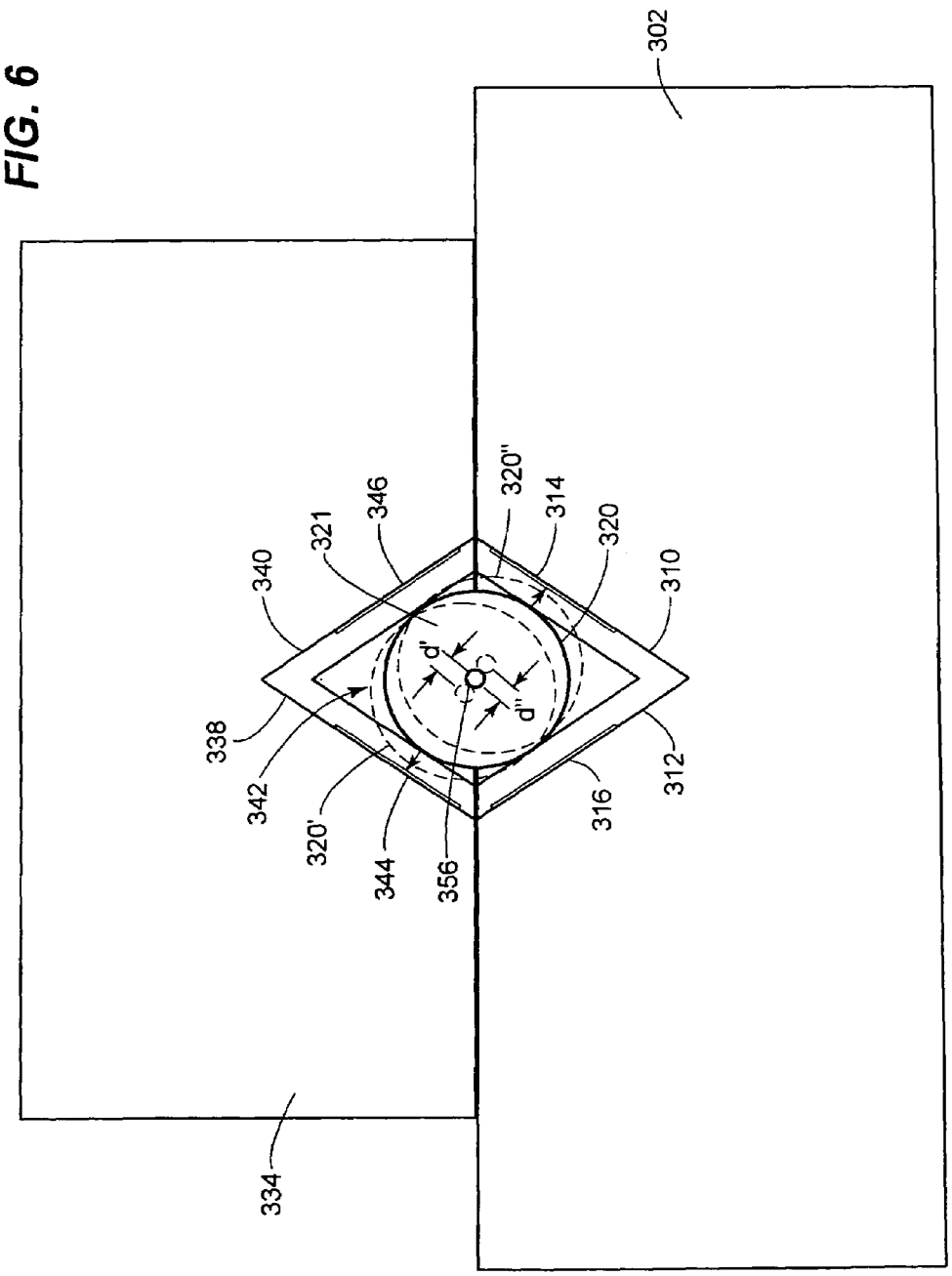
FIG. 6 is a cross-sectional view of the structure of FIG. 5 (assembled) looking along lines BB of FIG. 5; the view showing example positions of a movable cantilever portion of a waveguide.
Figure 7:
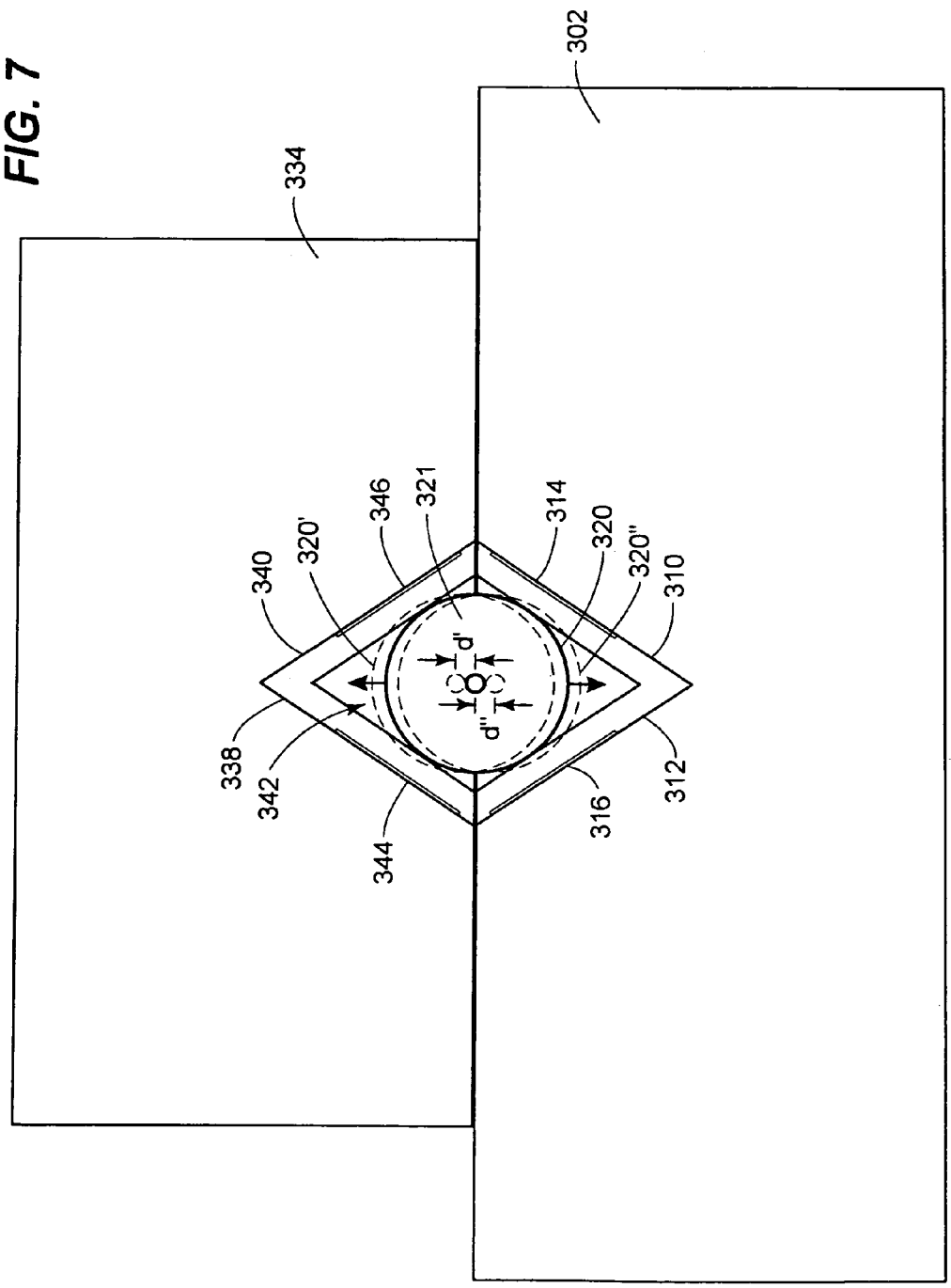
FIG. 7 is a cross-sectional view of the structure of FIG. 5 (assembled) looking along lines BB of FIG. 5; the view showing other example positions of a movable cantilever portion of a waveguide.

An example operation of assembled parts of the device 300 is partially shown in FIG. 6, a cross-section view from the terminus 331 of waveguide 330 looking along taken along lines BB of FIG. 5, and showing the terminus 321 of the optical fiber 320. The device 300 uses multiple lateral steering electrodes to control waveguide position. The electrodes 314, 316, 346 and 344 are adapted to deflect the optical fiber 320. In illustrated example of FIG. 6, 320' represents the fiber 320 deflected in a first direction, such that a fiber core 356 is offset from an un-actuated position a distance, d'. 320" represents the fiber 320 deflected in a second direction, such that the fiber core 356 is offset from an un-actuated position a distance, d". The fiber 320 may be deflected in different directions than those shown. FIG. 7, for example, shows the optical fiber 320 deflected along vertical directions into positions 320' and 320". Using adjacent electrodes, such as illustrated in FIG. 7, to move a waveguide results in significantly reduced electrostatic drive signal values. In FIGS. 6 and 7, the fiber 320 is shown moving in first and second directions (toward positions 320' and 320") that are parallel. There is a full range of movement into different directions, however. The device 300, as illustrated, includes the plurality of electrodes 314, 316, 344, 346 and 324, 326, 348, and 350 where some may receive an identical or different drive signal. Furthermore, the drive signal(s) may include a fixed bias voltage to achieve a desired un-actuated position between the fibers 320 and 330, for example, a "full-on," full-off," or "partially-attenuated" position.

The deflection of the optical fiber 330 would be similar to the examples provided in FIGS. 6 and 7 with respect to the fiber 320. The optical fiber position 320 of FIGS. 6 and 7 may be a non-deflected, axially-aligned position, whereas the positions 320' and 320" may be misaligned positions. Furthermore, while the v-groove pairs 304/352 and 306/354 are axially aligned, the pairs may be axially misaligned thereby building in an offset into the device 300.

Figure 8:
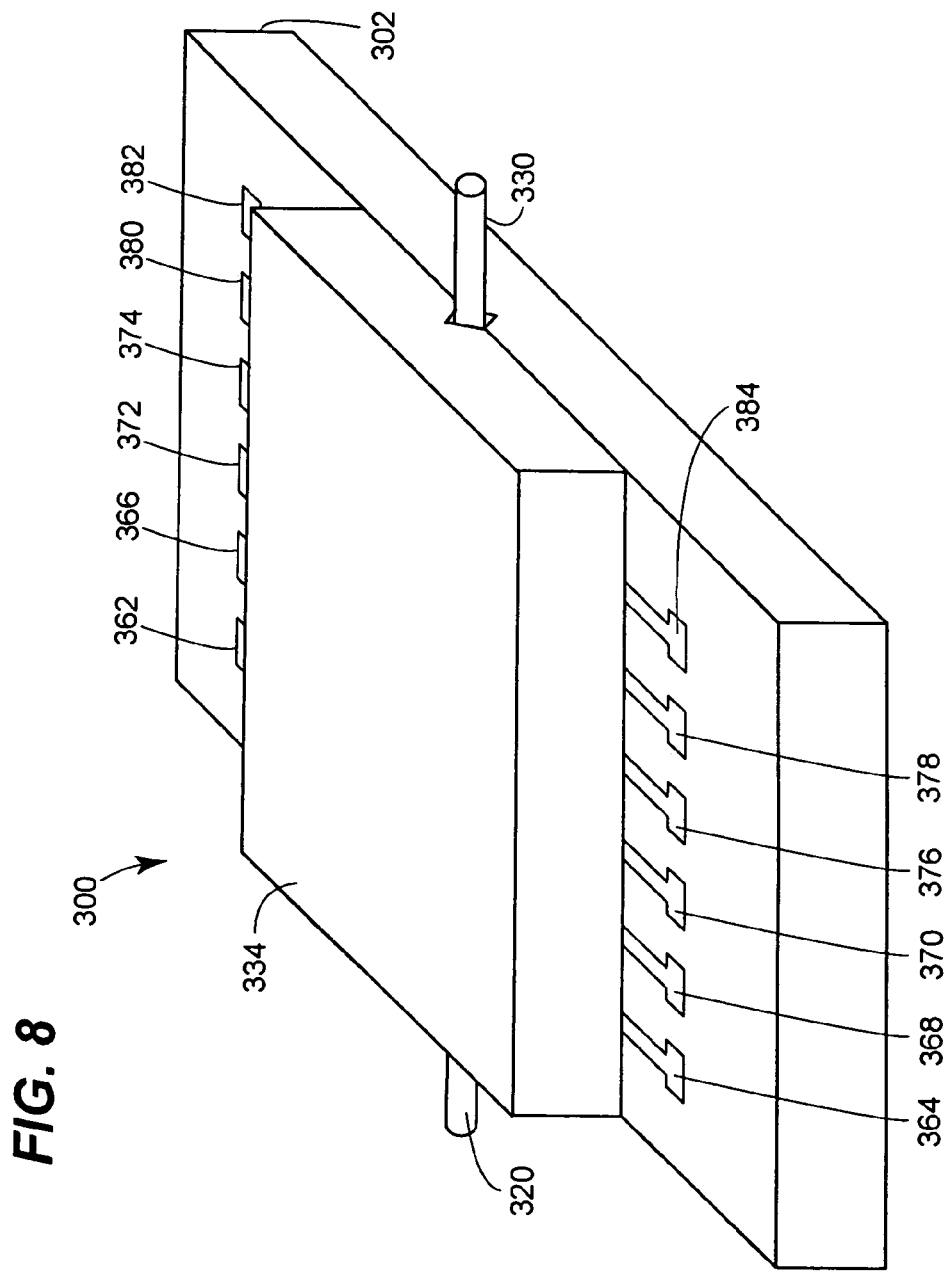
FIG. 8 is an illustration of the structure of FIG. 5 assembled.

The base portion 323 of the optical fiber 320 is placed in the supports 304 and 352. Support 304 has an electrode 360 that contacts the metal layer 322. Conductive pads 362 and 364 may be used to electrically excite the layer 322. The electrodes 314 and 316 are connected to conductive pads 366 and 368 respectively. To deflect the optical fiber 320 downwards, for example, a drive signal may be applied across the conductive pad 362 (and/or 364) and one or both of the conductive pads 366 and 368. The top electrodes 344 and 346 are connected to conductive leads 370 and 372, respectively, when the top member 334 is formed on the base member 302. As shown in FIG. 8, these leads are exposed in the assembled device 300. A voltage may be applied across pad 362 (and/or 364) and the lead 370 and/or the lead 372 to deflect the optical fiber 320 upwards. Deflection of the optical fiber 330 is achieved in a similar manner using leads 374 and 376, as well as conductive pads 378, 380, 382, and 384.

Figure 9:
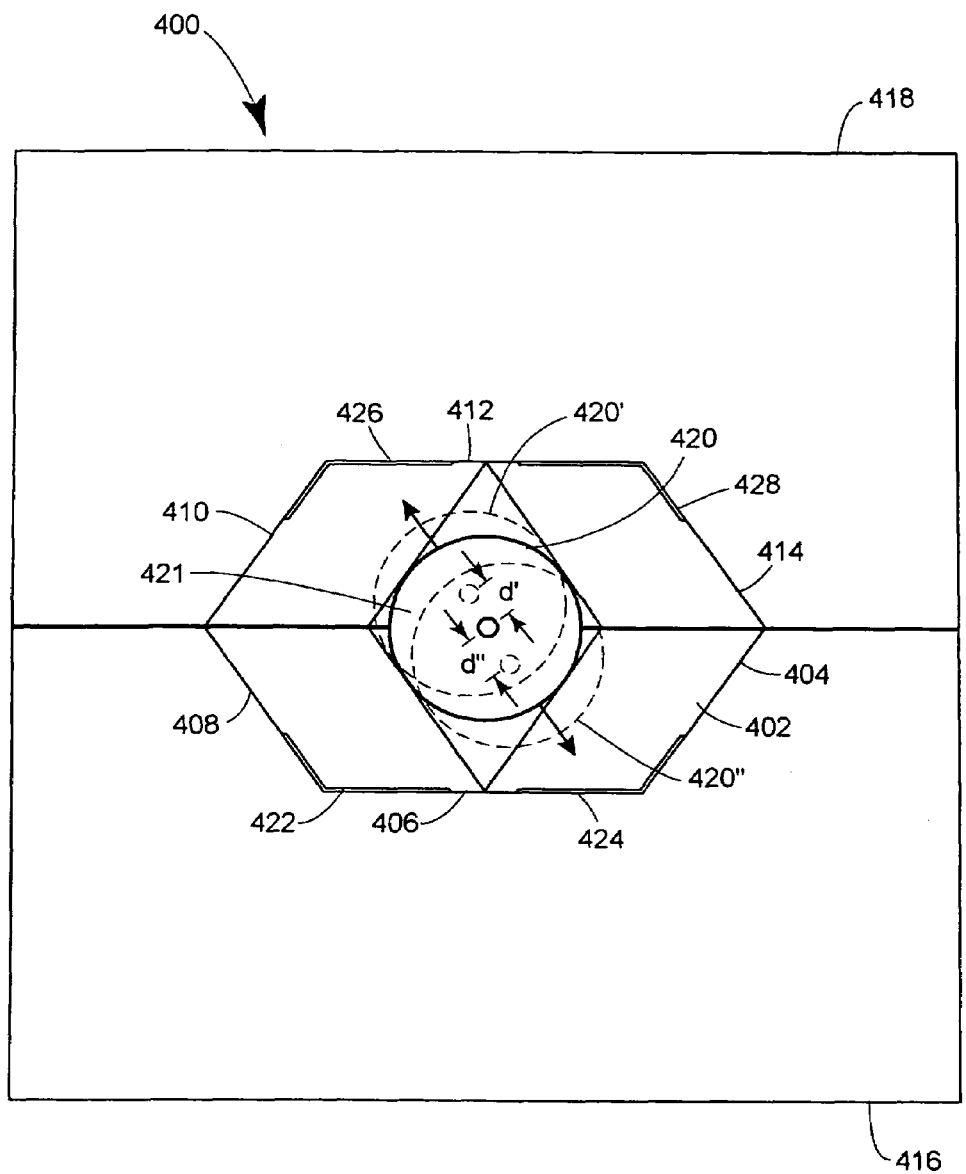
FIG. 9 is a cross-sectional view similar to that of FIGS. 6 and 7, but showing another example optical attenuator.

FIG. 9 illustrates a cross-sectional view of another optical attenuator 400 having a cavity 402 formed of six walls 404, 406, 408, 410, 412, and 414. A base member 416 and a top member 418 form the device 400. In the illustrated example, an optical fiber 420 with terminus 421 is shown in three different positions, 420, 420', and 420". Electrodes 422, 424, 426, and 428, along with a conductive electrode (not shown) on the fiber 420 are used to form an electrically driven actuator for deflecting the fiber 420. Control may be achieved in a similar manner to that described above with respective to FIG. 5.

Figure 10:
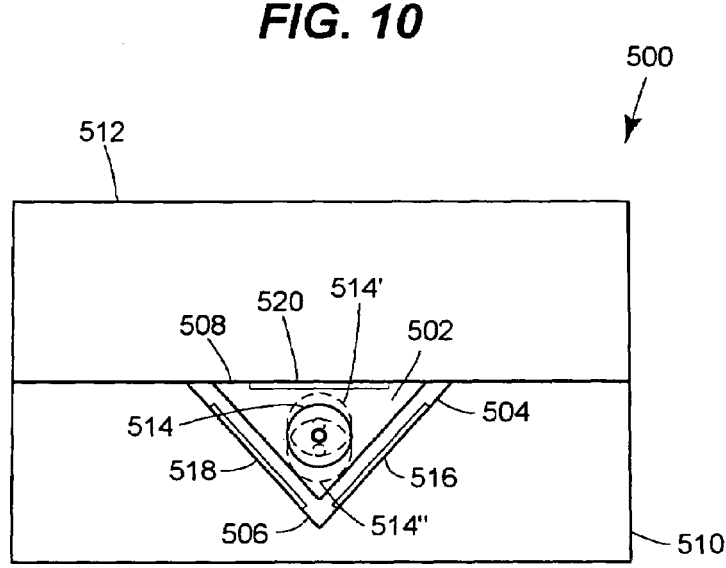
FIG. 10 is a cross-sectional view similar to that of FIGS. 6, 7, and 9, but showing another example optical attenuator.

FIG. 10 illustrates a cross-sectional view of another optical attenuator 500 having a cavity 502 formed of three side walls 504, 506, and 508. A base member 510 and a top member 512 form the device 500. In the illustrated example, an optical fiber 514 is shown in three different positions, 514, 514', and 514". Electrodes 516, 518, and 520, along with a conductive electrode (not shown) on the fiber 514 are used to form an electrically driven actuator for deflecting the fiber 514. Control may be achieved in a similar manner to that described above with respective to FIG. 5.

With the above examples, the use of a symmetrical pair of cantilever waveguide portions that are freely deflectable in different directions means that less deflection of each waveguide is needed to achieve a given attenuation. As a result, shorter waveguide cantilever lengths, higher resonant frequency, and faster response times may be achieved. Also, common mode cancellation of acceleration deflection induced errors may be achieved and temperature induced errors reduced. Furthermore, freely supported, cantilevered movable portions have little or no hysteresis, because there is no bottoming or rolling contact area, thereby avoiding rubbing and sliding that plagues other devices.

Other geometries may be used for the cavities and recesses described. For example, the recesses may be curved in cross-section, i.e., semi-circular in shape. Also, alternative electrode geometries or patterns may be used. Electrode geometries and control schemes may be used to increase the amount of deflection before an unstable electrostatic snap down position is reached, for example.

Snap down is a condition whereby a fiber end is uncontrollably deflected until it actually moves into direct contact with the pulling electrode. The condition results from the following. The electrostatic force between a coated optical fiber and an adjacent electrode increases approximately as the inverse square of the gap between the two. The restoring spring force in an optical fiber increases linearly with deflection, however. As the drive voltage increases and the gap between a fiber and an adjacent electrode decreases, an unstable point is reached where the exponentially increasing electrostatic force overpowers the linearly increasing spring force in the fiber, and the fiber suddenly snaps-down onto the pulling electrode.

The snap down point may be adjusted by replacing the electrodes within the recesses with multiple electrodes that receive different drive voltages. A suitable interlaced, or interdigital, electrode pattern was described in a co-pending patent application U.S. Ser. No. 10/261,111 filed on Sep. 30, 2002 entitled "VARIABLE OPTICAL ATTENUATOR", which is incorporated herein by reference.

Numerous other alternatives will now become apparent to persons of ordinary skill in the art. For example, a dielectric oil fill material may also be used in the cavities of the devices 200, 300, 400, and 500 to reduce drive voltage, dampen vibration, and eliminate end face reflections. The presence of environmental vibration, up to typically 2 kHz, may cause the cantilever portions to vibrate at their resonant frequencies. The length of the cantilever portion, i.e., extending from a base portion, may be set to prevent such resonance. With a fill material, the system may be critically damped to eliminate resonance allowing for longer aspect ratios for the cantilevered portions.

With or without a fill material, it may be desired to provide an angle on the terminus for each movable portion. For example, an 8° angle may be used to reduce end face reflections back into the fiber. Further, an antireflection coating on each terminus may also be used to reduce transmission losses.

Figure 11:
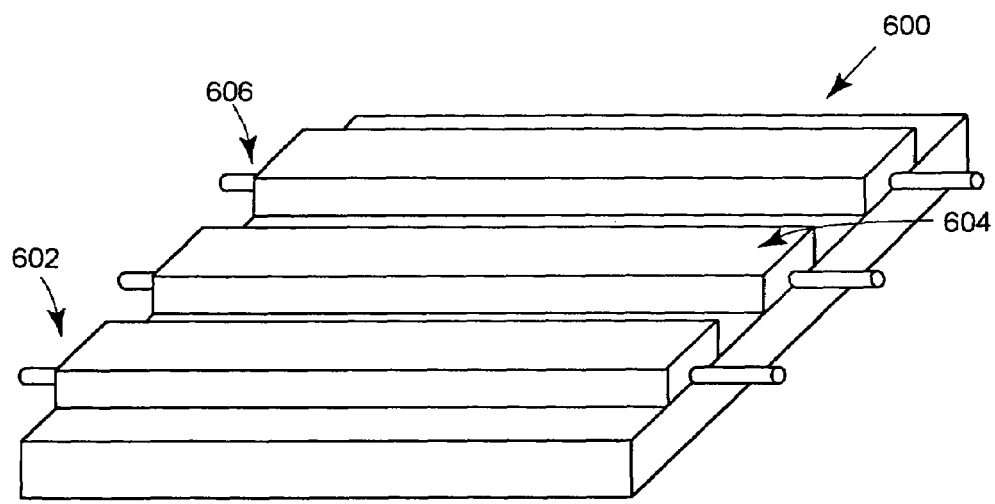
FIG. 11 is an illustration of a variable optical attenuator array.

FIG. 11 illustrates a variable attenuation array device 600 formed of individually controlled variable optical attenuators 602, 604, and 606. The array device 600 is used to set similar or dissimilar attenuation levels in three different optical communication paths. A single controller can individually operate each of the devices 602, 604 and 606. The array device 600 may include additional or fewer optical attenuators. Each of the attenuators 602, 604 or 606 may represent any of the devices 200, 300, 400, 500, or others described herein.

Figure 12:
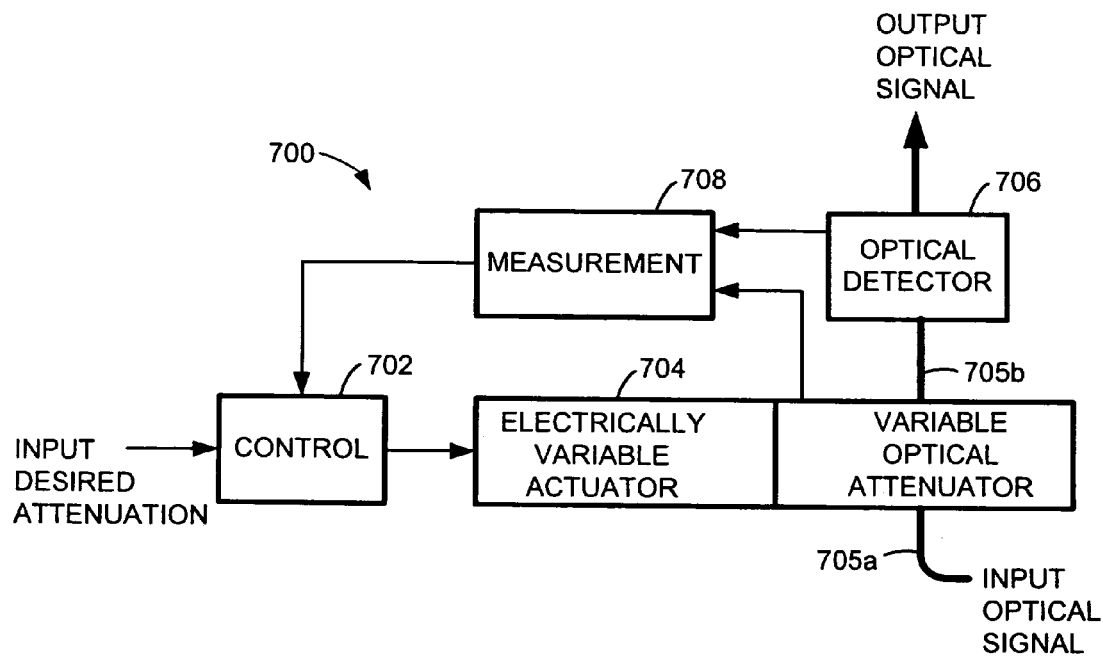
FIG. 12 is a block diagram showing an example closed-loop control system for operating an optical attenuator.

FIG. 12 shows a block diagram of an example processing system 700 for operating an optical attenuator. A control block 702 receives an input signal or command by which the desired attenuation level is set. The control block 702 may include memory and readable and executable software routines. The control block 702 may store or access a look-up table of data representing drive voltage versus attenuation levels. A signal from block 702 is provided to an EVA (electronically variable actuator) and VOA (variable optical attenuator) block 704. The control block 702 controls the EVA and VOA block 704, which may include the assemblies 200, 300, 400, and/or 500. The block 704 may further include multiple actuators. The block 704 receives an optical signal via an input waveguide 705*a* and has an output waveguide 705*b* that may connect to an optional optical detector block 706 that measures the optical output power and provides a signal to a measurement block 708.

Using the system 700 with the optical attenuator 200, for example, the movable portion 205 is deflected by a DC signal applied to the electrode 218. If attenuation is controlled by an electrical parameter like capacitance, the control block 702 would provide an AC signal across the electrode 218 and the electrode 220, via the EVA and VOA block 704, to detect a detectable value of the electrical parameter. That is, the AC signal is used to detect the actual capacitance between the electrodes 218, 220. Capacitance, current, inductance, frequency, and other electrical parameters may be detected in a similar manner. Thus, a single electrode pair may be used to deflect a movable portion of a waveguide and may be used to determine or sense a detectable value of an electrical parameter related to the position of that movable portion, for feedback control. Alternatively, separate electrodes may be used for movement and for detection.

In one configuration, the detectable value from block 704 is provided to the measurement block 708, which may derive an actual parameter value (e.g., calculate a capacitance value in farads) or the block 708 may compute a distance or attenuation based upon the detectable value. The measurement block 708 may be part of a controller or processor that includes other blocks shown in FIG. 12. The detected value of the electrical parameter is provided by the block 708 to the control block 702, which determines if the detected value equals the desired electrical parameter value. The control block 702 may also determine if a desired misalignment or position value has been achieved. If the two values do not match, the control block 702 will direct the block 704 to move one or both movable portions accordingly until the two values agree. If the two values do match and the desired attenuation is not achieved—a determination that could be made with the use of a separate photo detector as illustrated by the block 706 and having an input provided to the control block 702—then the control block 702 can adjust the termini position in the system until the desired attenuation is achieved. The control block 702 may also up-date its look-up table data in such cases, as they would suggest that the stored attenuation versus electrical parameter data is no longer accurate.

FIG. 12, therefore, illustrates a system that performs closed loop position stabilization on a movable cantilever portion of an optical waveguide. Numerous alternatives to the control system 700 will be known to persons of ordinary skill in the art. By way of example, the measurement block 708 may measure temperature and, in conjunction with the control block 702 or alone, provide a temperature compensation coefficient that is used in determining the movable cantilever position necessary for a given desired optical attenuation. Furthermore, the measurement block 708 may receive a signal indicating the wavelength of the optical signal out from the optical detector block 706 or another source in the optical signal system. That signal may be compared to a reference wavelength and the comparison used to also adjust the position of the movable cantilever portion.

The processing of FIG. 12 may be achieved entirely on an optical attenuator chip that has a control circuit and memory storage, or the processing may be from external components. It will be understood by persons of ordinary skill in the art that the processing shown may further include additional processing blocks and/or an input device like a keyboard, touch-screen or other manual input or user-interface device, as well as an output device like a computer monitor.

Figure 13:
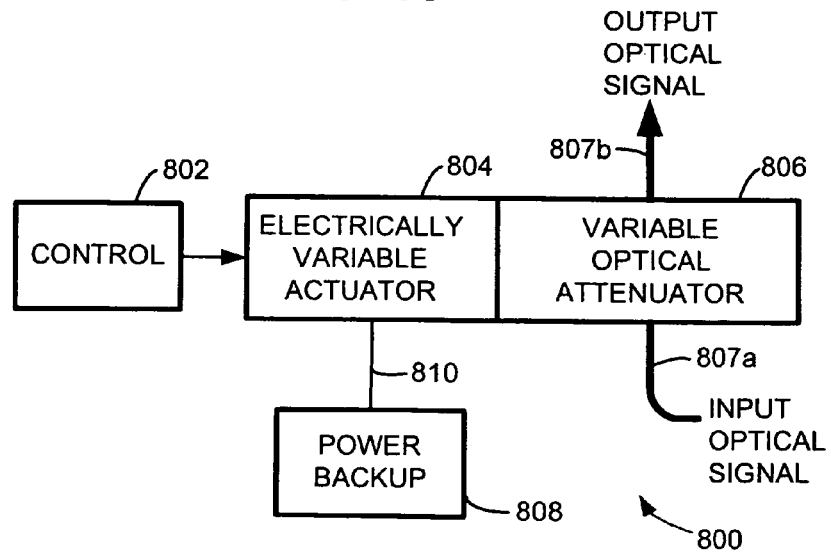
FIG. 13 is a block diagram showing an example power back-up system for operating an optical attenuator.

FIG. 13 shows an alternative processing system 800 of an optical attenuator. As illustrated, a control block 802 has memory storage or access and readable and executable software routines for determining a desired drive signal for deflecting a movable portion of a waveguide, when the block 802 supplies that drive signal to an EVA block 804. The block 804 deflects a waveguide or multiple waveguides within a VOA block 806. An input waveguide 807*a* and an output waveguide 807*b* are shown coupled to the VOA 806.

FIG. 13 further includes a power backup block 808 that ensure a constant drive signal voltage is applied to the block 804 such that, if the power to the control block 802, or to the block 804, is removed for some reason, the power backup block 808 will power the block 804, retaining the drive signal to the actuator electrode(s), to retain the terminus and movable portion in their pre-fault positions. The processing of FIG. 13 is a hold-in-place control that maintains optical attenuation at a given value, even upon fault. Alternatively, the system block 800 may reset the attenuation position of the movable waveguide(s) to a steady-state position, for example a "full-on," "full-off," or "partially-attenuating" position.

The power backup block 808 may be achieved in known ways. For example, it may be a battery backup or any power source that supplies power under a controlled slow leakage, such as a super-capacitor. Various response times may be used for the power backup block 808, however, in the preferred example, the power backup block 808 is continuously coupled to the EVA block 804 via electrical connection 810 so that the terminus position does not change upon fault.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What we claim is:

1. An electrically variable optical attenuator comprising:
   a first waveguide having a base portion and a movable cantilever portion extending from the base portion, the cantilever portion including a first terminus;
   a first support adapted to receive the base portion of the first waveguide such that the movable cantilever portion extends from the base portion and is suspended free of support;
   a second waveguide having a second terminus;
   a second support adapted to receive at least a portion of the second waveguide such that the second terminus and the first terminus are in a first, optically coupled state having a first optical attenuation; and an electrically driven actuator having at least one electrode that is adapted to move the first terminus relative to the first support such that the first terminus and the second terminus are in a second, optically coupled state, and that is adapted to sense a first parameter value that varies with a position of the first terminus, wherein the electrically driven actuator comprises an electrode disposed directly on at least a portion of the movable cantilever portion for movement of the first terminus.

2. The electrically variable optical attenuator of claim 1, wherein the at least one electrode comprises at least one fixed electrode disposed adjacent the electrode on the movable cantilever portion.

3. The electrically variable optical attenuator of claim 2, wherein the at least one fixed electrode comprises a plurality of electrodes disposed adjacent the electrode on the movable cantilever portion.

4. The electrically variable optical attenuator of claim 3, wherein the plurality of electrodes are driven by a plurality of drive signals to selectively move the first terminus in a plurality of directions relative to the second terminus.

5. The electrically variable optical attenuator of claim 1, wherein the first parameter value is an electrically sensed value taken from the group consisting of capacitance, inductance, resistance, current and voltage.

6. The electrically variable optical attenuator of claim 1, wherein the first parameter value is capacitance.

7. The electrically variable optical attenuator of claim 1, wherein the electrically driven actuator is adapted to move the first terminus in response to a comparison of the first parameter value to a first desired parameter value.

8. The electrically variable optical attenuator of claim 1, wherein the electrically driven actuator is driven with a fixed bias voltage.

9. The electrically variable optical attenuator of claim 1, wherein the second waveguide includes a base portion and a movable cantilever portion having the second terminus and wherein the second support receives the base portion of the second waveguide, the electrically variable optical attenuator further comprising:

a second electrically driven actuator adapted to move the second terminus relative to the first terminus.

10. The electrically variable optical attenuator of claim 9, wherein the electrically driven actuator comprises a first electrode disposed on the movable cantilever portion of the first waveguide and at least one second electrode disposed adjacent the first electrode and wherein the second electrically driven actuator comprises a third electrode disposed directly on the movable cantilever portion of the second waveguide and at least one fourth electrode disposed adjacent the third electrode.

11. The electrically variable optical attenuator of claim 9, wherein the electrically driven actuator is adapted to deflect the first terminus in a first direction and the second electrically driven actuator is adapted to deflect the second terminus in a second direction different than the first direction.

12. The electrically variable optical attenuator of claim 9, wherein the electrically driven actuator is driven by at least one first drive signal and the second electrically driven actuator is driven by at least one second drive signal.

13. The electrically variable optical attenuator of claim 12, wherein the at least one first drive signal and the at least one second drive signal comprise a common drive signal.

14. An optical attenuator array, comprising a plurality of the electrically variable optical attenuators of claim 9, where each of the plurality of the electrically variable optical attenuators is adapted to individually achieve any one of a range of desired optical attenuations.

15. The electrically variable optical attenuator of claim 1, further comprising a back-up power source having stored power sufficient to operate the electrically driven actuator upon a reduction in externally supplied power.

16. The electrically variable optical attenuator of claim 1, wherein the electrically driven actuator is an electrothermic actuator.

17. The electrically variable optical attenuator of claim 1, wherein the electrically driven actuator is an electromagnetic actuator.

18. The electrically variable optical attenuator of claim 1, wherein the electrically driven actuator is an electrostatic actuator.

19. The electrically variable optical attenuator of claim 1, wherein the first waveguide is a first optical fiber having a cladding and a core and the second waveguide is a second optical fiber having a cladding and a core.

20. The electrically variable optical attenuator of claim 19, wherein at least one of the first optical fiber or the second optical fiber has a narrowed cladding section.

21. An optical attenuator array, comprising a plurality of the electrically variable optical attenuators of claim 1, where each of the plurality is adapted to individually achieve any one of a range of desired optical attenuation.

22. An electrically variable optical attenuator comprising:

a first support for supporting a first optical waveguide having a core and a cladding, the waveguide having a conductive movable cantilever portion formed of an electrode deposited on the cladding and suspended free of support;

a second support for supporting a second optical waveguide having a core and a cladding, the waveguide having a conductive movable cantilever portion formed of an electrode deposited on the cladding and suspended free of support;

a first electrically driven actuator having a first plurality of electrodes disposed on a cavity surface and adjacent the electrode of the conductive movable cantilever portion of the first optical waveguide for selectively deflecting the conductive movable cantilever portion of the first optical waveguide; and a second electrically driven actuator having a second plurality of electrodes disposed on the cavity surface and adjacent the electrode of the conductive movable cantilever portion of the second optical waveguide for selectively deflecting the conductive movable cantilever portion of the second optical waveguide, wherein each of the first plurality of electrodes is capable of selectively deflecting the conductive movable cantilever portion of the first optical waveguide and sensing a first parameter value that varies with a position of the conductive movable cantilever portion of the first optical waveguide.

23. The electrically variable optical attenuator of claim 22, wherein the cavity surface comprises at least three side walls.

24. The electrically variable optical attenuator of claim 22, wherein a second parameter value varies with a position of the conductive movable cantilever portion of the second optical waveguide, wherein the first parameter value and the second parameter value are electrically sensed values taken from the group consisting of capacitance, inductance, resistance, current and voltage, and the second electrically driven actuator is adapted to sense the second parameter value.

25. The electrically variable optical attenuator of claim 24, wherein at least one of the first parameter value and the second parameter value is capacitance.

26. The electrically variable optical attenuator of claim 24, wherein the first electrically driven actuator is adapted to move the first optical waveguide in response to a comparison of the first parameter value to a first desired parameter value and wherein the second electrically driven actuator is adapted to move the second optical waveguide in response to a comparison of the second parameter value to a second desired parameter value.

27. The electrically variable optical attenuator of claim 22, wherein the first plurality of electrodes are driven by a first plurality of drive signals and wherein the second plurality of electrodes are driven by a second plurality of drive signals.

28. The electrically variable optical attenuator of claim 22, wherein the cavity surface has a varying depth with respect to the first optical waveguide or the second optical waveguide.

29. An electrically variable optical attenuator comprising:
a first waveguide having a base portion and a movable cantilever portion including a first terminus;
a first support adapted to receive the base portion of the first waveguide such that the movable cantilever portion of the first waveguide extends from a distal end of the first support and is suspended free of support;
a second waveguide having a base portion and a movable cantilever portion including a second terminus;
a second support adapted to receive the second waveguide such that the movable cantilever portion of the second waveguide extends from a distal end of the second support and is suspended free of support, and such that the second terminus and the first terminus are adjacent one another in a first, optically coupled state having a first optical attenuation;
a first electrically driven actuator adapted to move the first terminus relative to the second terminus and relative to the distal end of the first support and in a first direction, wherein the first electrically driven actuator is able to sense a first parameter value that varies with a position of the first terminus, wherein the first electrically driven actuator comprises an electrode disposed directly on at least a portion of the movable cantilever portion of the first waveguide for movement of the first terminus and a first electrode disposed in a fixed position relative to the electrode disposed directly on at least the portion of the movable cantilever portion of the first waveguide;
a second electrically driven actuator adapted to move the second terminus relative to the first terminus and relative to the distal end of the second support and in a second direction different than the first direction, wherein the second electrically driven actuator is able to sense a second parameter value that varies with a position of the second terminus, wherein the second electrically driven actuator comprises an electrode disposed directly on at least a portion of the movable cantilever portion of the second waveguide for movement of the second terminus and a second electrode disposed in a fixed position relative to the electrode disposed directly on at least the portion of the movable cantilever portion of the second waveguide; and
a controller coupled to control the first electrically driven actuator and the second electrically driven actuator to prevent the first electrode from shorting against the electrode disposed directly on at least the portion of the movable cantilever portion of the first waveguide and to prevent the second electrode from shorting against the electrode disposed directly on at least the portion of the movable cantilever portion of the second waveguide.

30. A method of variable optical attenuation comprising:
disposing an optical waveguide in a first support and adjacent at least one electrode of an electrically driven actuator, the optical waveguide having a cantilever portion including a first terminus that is suspended free of support;
forming a second electrode of the electrically driven actuator directly on the optical waveguide;
disposing a second optical waveguide in a second support such that a second terminus of the second optical waveguide is optically coupled to the first terminus in a first position;
driving the at least one electrode and the second electrode of the electrically driven actuator to move the first terminus relative to the second terminus to a second position to achieve any one of a range of desired optical attenuations, wherein the optical waveguide and the second optical waveguide are optically coupled in the second position; and
using the second electrode and the at least one electrode to sense a first parameter value that varies with the position of the first terminus.

31. The method of claim 30, wherein forming the second electrode comprises depositing a conductive layer on a cladding of the waveguide.

32. The method of claim 30, wherein the at least one electrode comprises a plurality of electrodes adjacent the cantilever portion, the method further comprising selectively driving the plurality of electrodes to move the first terminus in any one of a plurality of different directions.

33. The method of claim 30, further comprising:
driving the at least one electrode with a fixed bias voltage.

34. The method of claim 30, further comprising:
measuring the first parameter value; and
in response to the measurement, adjusting the position of the first terminus relative to the second terminus to achieve a desired optical attenuation.

35. The method of claim 34, wherein the first parameter value is selected from the group consisting of capacitance, inductance, resistance, current and voltage.

36. The method of claim 34, wherein adjusting the position comprises comparing the first parameter value to a first desired parameter value.

37. The method of claim 30, wherein the second optical waveguide includes a cantilever portion extending from the second support, the method further comprising:
driving a second electrically driven actuator adjacent the second optical waveguide, to move the second terminus relative to the first terminus to achieve the any one of a range of desired optical attenuations.

38. The method of claim 37, further comprising:
driving the electrically driven actuator with at least one first drive signal; and driving the second electrically driven actuator with at least one second drive signal.

* * * * *

UNITED STATES PATENT AND TRADEMARK OFFICE
CERTIFICATE OF CORRECTION

PATENT NO. : 7,197,225 B2 Page 1 of 1
APPLICATION NO. : 10/430845
DATED : March 27, 2007
INVENTOR(S) : Mark G. Romo et al.

It is certified that error appears in the above-identified patent and that said Letters Patent is hereby corrected as shown below:

On the First Page:

At field (57), line 1, "has a first" should be -- has first --.

In the Specification:

At Column 6, lines 63-64, "along taken along lines" should be -- along lines --.

At Column 10, line 29, "ensure" should be -- ensures --.

Signed and Sealed this

Eleventh Day of March, 2008

JON W. DUDAS
*Director of the United States Patent and Trademark Office*